United States Patent
Chow et al.

(10) Patent No.: US 7,050,395 B1
(45) Date of Patent: May 23, 2006

(54) METHOD AND APPARATUS FOR DISABLING AN INTERFACE BETWEEN NETWORK ELEMENT DATA PROCESSING UNITS

(75) Inventors: Felix Chow, San Jose, CA (US); David Stiles, Los Gatos, CA (US)

(73) Assignee: Redback Networks Inc., San Jose, CA (US)

( * ) Notice: Subject to any disclaimer, the term of this patent is extended or adjusted under 35 U.S.C. 154(b) by 891 days.

(21) Appl. No.: 09/997,375

(22) Filed: Nov. 30, 2001

(51) Int. Cl.
*G01R 31/08* (2006.01)

(52) U.S. Cl. ...................................... 370/231; 370/230

(58) Field of Classification Search ................ 370/229, 370/230, 231; 714/749
See application file for complete search history.

(56) References Cited

U.S. PATENT DOCUMENTS

| | | | |
|---|---|---|---|
| 4,574,284 A * | 3/1986 | Feldman et al. ....... 340/825.52 |
| 4,696,001 A * | 9/1987 | Gagliardi et al. ............. 398/60 |
| 4,951,281 A * | 8/1990 | Muto et al. .................. 370/449 |
| 5,400,369 A | 3/1995 | Ikemura |
| 5,533,018 A | 7/1996 | DeJager et al. |
| 5,550,820 A | 8/1996 | Baran |
| 5,621,773 A | 4/1997 | Varma et al. |
| 5,781,801 A * | 7/1998 | Flanagan et al. ............. 710/56 |
| 5,963,564 A | 10/1999 | Petersen et al. |
| 6,198,751 B1 | 3/2001 | Dorsey et al. |
| 6,237,029 B1 | 5/2001 | Master et al. |
| 6,388,992 B1 * | 5/2002 | Aubert et al. ................ 370/232 |
| 6,549,119 B1 * | 4/2003 | Turner ........................ 340/10.5 |
| 6,680,946 B1 * | 1/2004 | Isoyama et al. ........ 370/395.61 |
| 2001/0033580 A1 | 10/2001 | Dorsey et al. |
| 2002/0018468 A1 | 2/2002 | Nishihara |

\* cited by examiner

*Primary Examiner*—Duc Ho
*Assistant Examiner*—Thien D. Tran
(74) *Attorney, Agent, or Firm*—Blakely, Sokoloff, Taylor & Zafman LLP

(57) ABSTRACT

A method and apparatus for disabling a data interface between network element data processing units is described. In one embodiment, the method includes transmitting data frames over a data connection through an interface of a first network element data processing unit to a second network element data processing unit, disabling the interface, receiving an interface disable signal, completing transmission of data frames currently being transmitted, upon receiving an interface disable signal, disabling the interface, the disabling not causing data loss, receiving acknowledgements over the data connection, and enabling the data connection after receiving a number of acknowledgements.

16 Claims, 6 Drawing Sheets

METHOD AND APPARATUS FOR DISABLING AN INTERFACE BETWEEN NETWORK ELEMENT DATA PROCESSING UNITS

FIELD OF THE INVENTION

The invention relates to the field of communications. More specifically, the invention relates to disabling interface between network element data processing units.

BACKGROUND OF THE INVENTION

Network elements receive and transmit data packets through networks. When data is received in a network element, such data is stored and processed by various memory storage devices and processing units and circuitry, such as Application Specific Integrated Circuits (ASICs). For example, a number of different units/circuitry are typically involved in the processing of the data, wherein the data is transferred among such units/circuitry. Typically, when one unit/circuitry transmits data packets to another unit/circuitry, the receiving unit/circuitry sends an acknowledgement message to the transmitting unit/circuitry, verifying receipt of the data.

In conventional network elements, a unit/circuitry can only send some maximum number of data packets, to a different unit/circuitry, without receiving acknowledgements. Accordingly, when the maximum number of data packets has been sent without receiving acknowledgements, the transmitting unit/circuitry stops transmitting data because it is unclear whether the data packets have arrived at the receiving unit/circuitry. Often, when transmitting units/circuitry reach the maximum number of packets sent without receiving acknowledgements, the network elements do not diagnose or correct the faults that caused the loss of packets. Instead, such network elements may reset the transmitting unit/circuitry, the receiving unit/circuitry and/or the entire line card in order to allow for the resumption of the transmission of data between such units/circuitry. Disadvantageously, although the resetting of these units/circuitry or the line card containing such units/circuitry allow for the resumption of data transmissions, such hard resets may cause data stored within these units/circuitry to be lost.

SUMMARY OF THE INVENTION

These and other aspects of the present invention will be better described with reference to the Detailed Description and the accompanying Figures. A method and apparatus for disabling an interface between network element data processing units is described. In one embodiment, the method includes transmitting data frames over a data connection from a first network element data processing unit to a second network element data processing unit. The method further includes receiving an interface disable signal, completing transmission of data frames currently being transmitted, upon receiving an interface disable signal, and disabling the interface, the disabling not causing data loss. The method also includes receiving acknowledgements over the data connection and enabling the data connection after receiving a number of acknowledgements.

In another embodiment, the method includes disabling an interface between a first network element data processing unit and a second network element data processing unit, the disabling prohibiting the first network element from transmitting data frames to the second network element data processing unit, the disabling allowing the second network element data processing unit to transmit acknowledgements to the first network element data processing unit, and the disabling not causing data loss within the first and second network element data processing units.

In another embodiment, the method includes sending data frames from a first network element data processing unit over a data connection before receiving acknowledgements over the data connection from a second network element data processing unit, wherein a counter represents a number of data frames that may be sent before receiving the acknowledgements, and wherein the counter equal to zero indicates that no frames may be sent before acknowledgements are received. The method also includes decrementing the counter when data frames are sent from the first network element data processing unit, incrementing the counter when acknowledgements are received from the second network element data processing unit. The method further includes determining whether the counter is equal to zero, disabling an interface between the first and second network element data processing units, the disabling causing no data loss within the first and second network element data processing units, receiving acknowledgements in the first network element data processing unit, after the disabling, and enabling the interface when the counter equals a predetermined number.

In another embodiment, the apparatus comprises a first network element data processing unit, the first network element data processing unit to send acknowledgements and to receive data frames. The apparatus further comprises a second network element data processing unit, the second network element data processing unit to send data frames and to receive acknowledgements, and a data connection coupled to the first and second network data processing units, the data connection to be disabled such that the first network element data processing unit can send acknowledgements, but the second network element data processing unit cannot send data frames.

BRIEF DESCRIPTION OF THE DRAWINGS

Embodiments of the invention may be best understood by referring to the following description and accompanying drawings which illustrate such embodiments. The numbering scheme for the Figures included herein are such that the leading number for a given element in a Figure is associated with the number of the Figure. For example, system 100 can be located in FIG. 1. However, element numbers are the same for those elements that are the same across different Figures. In the drawings.

DETAILED DESCRIPTION

System Description

Typically, when network element data transfer interfaces are reset/disabled network element circuitry is reset causing stored data to be lost. Embodiments of the present invention enable circuitry within a network element to disable/reset a data transfer interface without resetting network element circuitry and without losing data.

Figure 1:
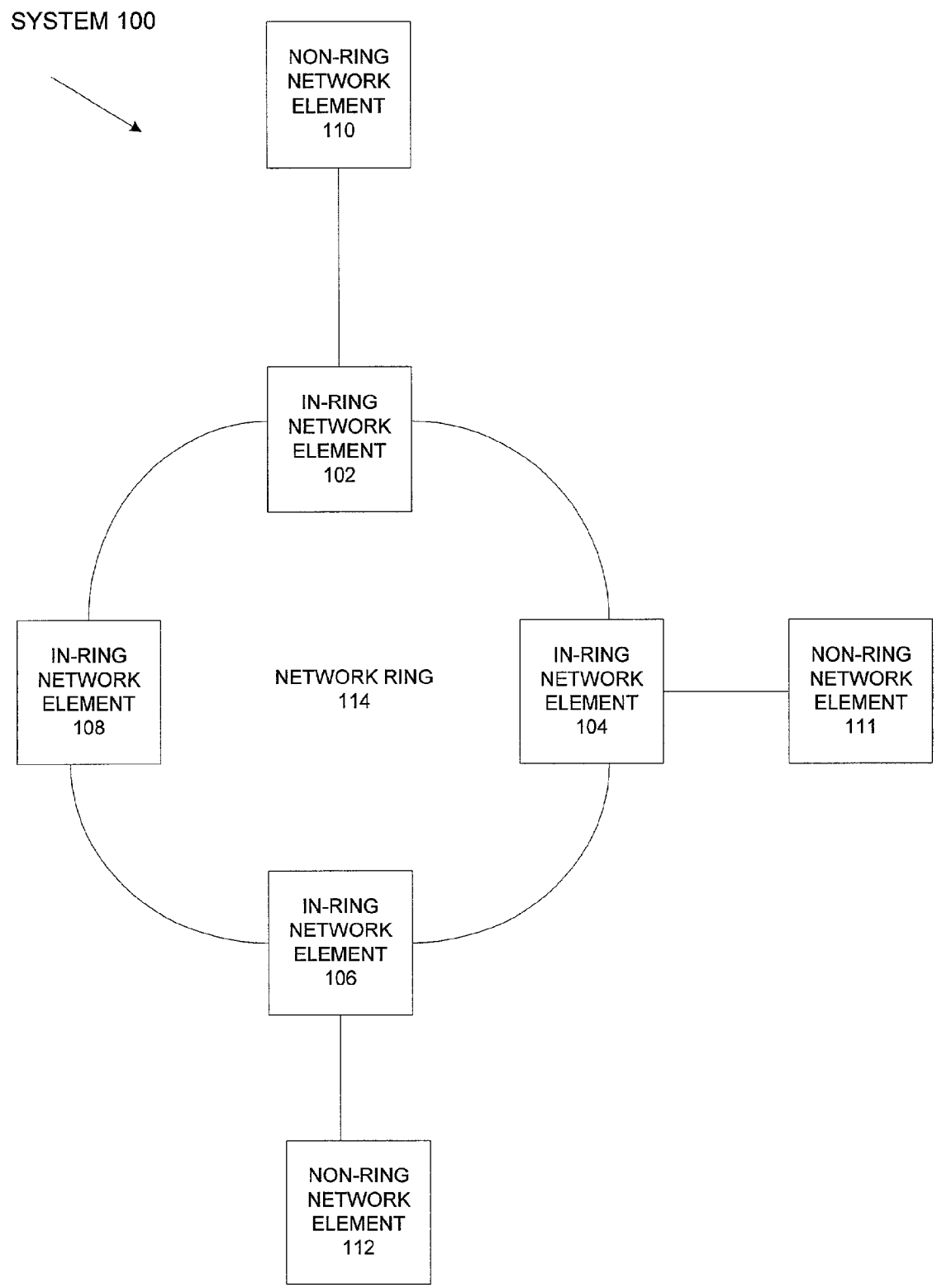
FIG. 1 is block diagram illustrating a system that incorporates embodiments of the present invention.

FIG. 1 is block diagram illustrating a system that incorporates embodiments of the present invention. In particular, FIG. 1 illustrates system 100 that includes network ring 114, which is comprised of in-ring network element 102, in-ring network element 104, in-ring network element 106 and in-ring network element 108. System 100 also includes non-ring network element 110, non-ring element 111 and non-ring network element 112, which are coupled to network ring 114 through in-ring network element 102, in-ring network element 104 and in-ring network element 106, respectively. In an embodiment, non-ring elements 110–112 can be routers, switches, bridges or other types of network element that switch data across a network.

In one embodiment, the connection among in-ring network element 102, in-ring network element 104, in-ring network element 106 and in-ring network element 108 allow for bi-directional traffic. Accordingly, this bi-directional capability allows for redundancy in the communication between the different network elements, such that if a given line of communication is lost, the data traffic to be transmitted thereon can be rerouted in the opposite direction to reach its intended destination within the ring architecture.

In an embodiment, system 100 transmits data traffic among the different network elements, both in-ring and non-ring, employing the Synchronous Optical Network (SONET) standard or Synchronous Digital Hierarchy (SDH). However, embodiments of the present invention are not so limited, as data traffic among the different network elements can be transferred using other types of transmission standards. Examples of other types of transmission standards can include, but are not limited to, T1, T3, Data Signal (DS)3 and DS1 signals. In one embodiment, data traffic among in-ring network element 102, in-ring network element 104, in-ring network element 106 and in-ring network element 108 includes TDM traffic and packet traffic within a same Time Division Multiplexing (TDM) signal.

In this ring network, network elements are used that can transmit and receive TDM ring traffic. In addition, at least certain of the network elements provide two different switching techniques—TDM and packet. The packet switching provided can support any number of protocols including layer 2 and layer 3 type protocols such as ATM, Ethernet, Frame Relay, etc. In addition to typical operations of a TDM network element, the network elements are implemented to be able to: 1) programmably select on an STS basis certain of the incoming TDM traffic to be extracted and packet switched rather than TDM switched; and/or 2) receive packet traffic in another form and to be packet switched. Regardless of which switching technique is used, the switched traffic going back onto the ring is put in TDM format and transmitted out. However, each time traffic is packet switched, that traffic can be statistically multiplexed (e.g., the packets can be selectively dropped based on various criteria). A further description of the operation of system 100 and the network elements therein is described in more detail below.

The architecture and configuration of system 100 is by way of example and not by way of limitation, as embodiments of the present invention can be incorporated in other types of systems. For example, other such systems could incorporate less or more network elements into the network ring and/or network elements attached thereto. Moreover, embodiments of the present invention are not limited to the network ring architecture as illustrated in FIG. 1. Examples of other types of network architectures that can incorporate embodiments of the present invention include, but are not limited to, a point-to-point configuration, point-to-multipoint configuration and/or a hub configuration. In addition, embodiments of the present invention are not limited to TDM networks, but also applies to Wave Division Multiplexing (WDM) networks.

Network Element Description

Figure 2:
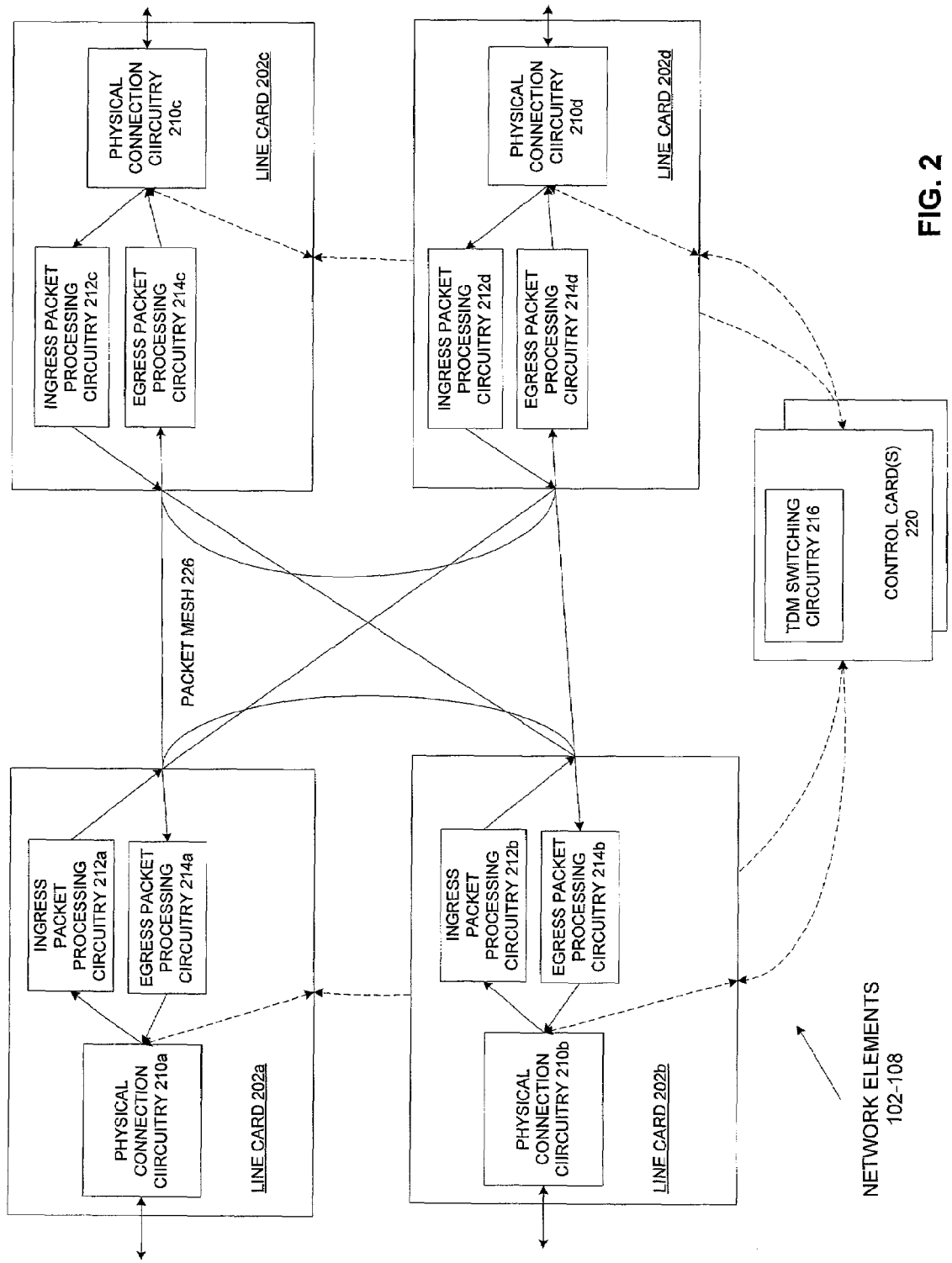
FIG. 2 illustrates portions of in-ring network elements 102–108, according to embodiments of the present invention.

FIG. 2 illustrates portions of in-ring network elements 102–108 (hereinafter "network element 102"), according to embodiments of the present invention. As shown, network element 102 includes line cards 202a–d and control card(s) 220, such that control card(s) 220 are coupled to each of line cards 202a–d. The number of line cards illustrated are for the sake of simplicity and not by way of limitation, as a lesser or greater number of line cards can be included within network element 102. Additionally, network element 102 includes a first switch fabric, packet mesh 226, which includes a full mesh such that each of line cards 202a–d are coupled to one another. For example, line card 202a is coupled to line cards 202b–d through packet mesh 226. However, embodiments of the present invention are not limited to a full mesh for the transmission of packets among line cards 202a–d, as any type of switching method that switches based on the addressing scheme described herein can be incorporated into embodiments of the present invention. For example, in one embodiment, line cards 202a–d could be coupled together using a switch fabric, such that the line cards are coupled to a control card, which provides for the switching therein.

Line cards 202a–d include physical connection circuitry 210a–d, ingress packet processing circuitry 212a–d and egress packet processing 214a–d, respectively. Physical connection circuitry 210a–d can be coupled to lines external to network element 102, as shown, which can carry optical and/or electrical signals, which is described in more detail below in conjunction with FIG. 7. In one embodiment, line cards 202a–d of network element 102 may be connected to an optical line transmitting SONET OC-N signals. Moreover, in an embodiment, line cards 202a–d of network element 102 may be connected to an electrical line such as a T1, T3, E1, E3, Ethernet, Gigabit Ethernet, etc. However, embodiments of the present invention are not limited to the above-described examples, as any other type of optical or electrical data transmission can be incorporated into embodiments of the present invention. Additionally, control cards(s) 220 include TDM switching circuitry 216.

In an embodiment, each line card 202a–d can be coupled to four optical and/or electrical lines. In another embodiment, each line card 202a–d can be coupled to eight optical and/or electrical lines. However, embodiments of the present invention are not so limited, as a lesser or greater number of optical and/or electrical lines can be coupled to network element 102 through line cards 202a–d. Additionally, physical connection circuitry 210a–d are coupled to ingress packet processing circuitry 212a–d, respectively, such that packet data being received from the optical and/or electrical lines is passed from physical connection circuitry 210a-d to ingress packet processing circuitry 212a-d, respectively. In one embodiment, the packet data is extracted from a TDM signal, which is described in more detail below.

Ingress packet processing circuitry 212a–d is coupled to packet mesh 226. Accordingly, each ingress packet processing circuitry 212a–d is coupled to each egress packet processing circuitry 214a–d, respectively, on other line cards 202a–d through packet mesh 226. Moreover, egress packet processing circuitry 214a–d is respectively coupled to physical connection circuitry 210a–d, such that packet data traffic coming in from packet mesh 226 from ingress packet processing circuitry 212a–d is transmitted from egress packet processing circuitry 214a–d to physical connection circuitry 210a–d, respectively.

Line cards incorporated into embodiments of the present invention are not limited to those illustrated by line cards 202a–d. Moreover, the network elements can have different line card configurations from that shown by line cards 202a–d. For example, a given in-ring network element could be limited to a single line card that can receive and transmit TDM traffic (which may include packet traffic) within network ring 114, employing multiple interfaces for the receipt and transmittal of TDM traffic. In another embodiment, a given in-ring network element can include a first line card to receive TDM traffic (which may include packet traffic) from another in-ring element, while a second line card can transmit TDM traffic to another or same in-ring network element. In one such embodiment, a third line card can be incorporated into this given in-ring network element to add, drop, and transmit different types of traffic including different types of packet traffic, such as ATM, Frame Relay, IP, etc, received and transmitted to a non-ring network element. In another embodiment, a given network element may include a single line card with multiple interfaces such that a first interface receives TDM traffic from another in-ring network element, a second interface transmits TDM traffic to another in-ring network element and a third interface adds, drops and transmits traffic, such as packet traffic to a non-ring network element.

Accordingly, a line card is used either to connect to an in-ring network element to form part of the ring, or to provide communication with out-of-ring network elements. To provide some examples with regard to a line card connected with an out-of-ring network element: 1) layer 2/3 traffic from out-of-ring network element can come in, go through the packet mesh to a line card connected to an in-ring network element, and then out onto the ring being carried by a SONET frame; 2) layer 2/3 traffic coming from an out-of-ring network element can be de-mapped into SONET, go through the TDM switch fabric to a line card connected to an in-ring network element, and then out onto the ring being carried by a SONET frame; 3) TDM traffic coming from an out-of-ring network element can come in, go through the TDM switch fabric to a line card connected to an in-ring network element, and then out onto the ring being carried by a SONET frame; 4) TDM traffic carrying layer 2/3 traffic can be processed to extract the layer 2/3 traffic, with the layer 2/3 traffic going through the packet mesh to a line card connected to an in-ring network element, and then out onto the ring carried by a SONET frame; layer 2/3 traffic coming from an out-of-ring network element can go through the packet mesh to a line card connected to an out-of-ring network element, and then go out of the ring being carried by the protocol of the interface of that egress line card; etc.

With regard to the TDM traffic, a second switch fabric (in addition to packet mesh 226) is formed among line cards 202a–d and TDM switching circuitry 216 of control cards 220, as illustrated by the dashed lines in FIG. 2. In particular, physical connection circuitry 210a–d is coupled to TDM switching circuitry 216 for the receiving and transmitting of TDM traffic into and out of network element 102. Accordingly, TDM switching circuitry 216 receive TDM traffic from physical connection circuitry 210a–d and switches this traffic to any of physical connection circuitry 210a–d, based on configuration data for the timeslots of the TDM traffic. For example, TDM switching circuitry 216 could be configured such that data within the first ten timeslots of a TDM signal, such as a SONET/SDH signal, received on a first interface of physical connection circuitry 210a are forwarded out the first five timeslots of a TDM signal being transmitted out from a first interface of physical connection circuitry 210d.

Figure 3:
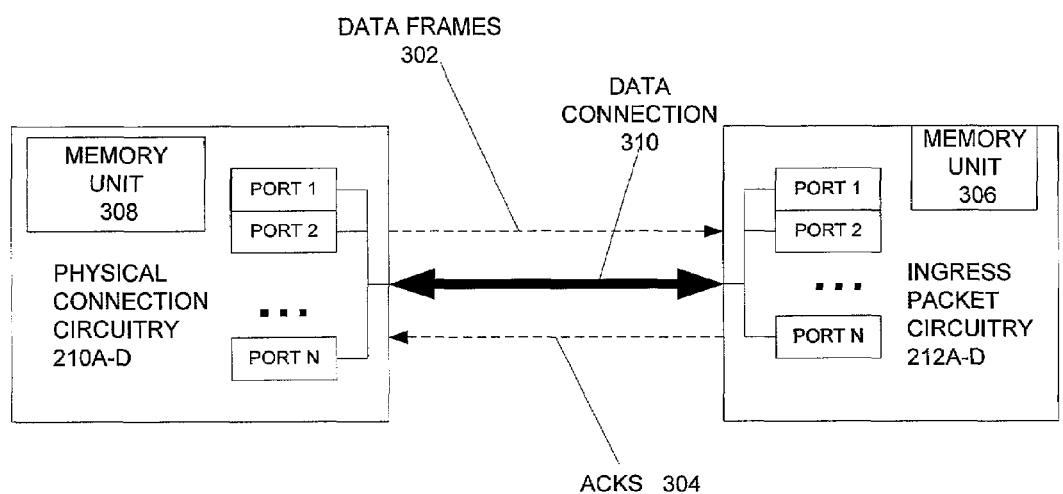
FIG. 3 is a block diagram of data processing units connected within a network element, according to embodiments of the present invention.

Transferring Packets Between Physical Connection Circuitry 210a–d and Ingress Packet Processing Circuitry 214a–d As noted above, lines cards 202a–d transmit traffic traveling from non-ring/ring network elements to non-ring/ring destinations. According to embodiments of the present invention, traffic may be in the form of data packets, which include header data and payload data. According to embodiments of the present invention, some data packets arriving into physical connection circuitry 210a–d are forwarded as data frames to ingress packet circuitry 212a–d. FIG. 3 is a block diagram of data processing units connected within a network element, according to embodiments of the present invention. In the embodiment shown in FIG. 3, data connection 310 couples physical connection circuitry 210a–d to ingress packet circuitry 212a–d. Physical connection circuitry 210a–d and ingress packet circuitry 212a–d include a number of ports through which they connect to data connection 310. In one embodiment the number of ports is 12, but other embodiments may include a greater or lesser number of ports; e.g. four, sixteen, or thirty-two ports. Data connection 310 allows for the transmission of data between physical connection circuitry 210a–d and ingress packet circuitry 212a–d. In the embodiment depicted in FIG. 3, data connection 310 includes a single bi-directional data pathway, but other embodiments may have multiple data pathways for transmitting data. In one embodiment, data connection 310 is a sixteen-bit interface (i.e. data connection 310 can carry sixteen data bits in parallel), but other embodiments may be larger or smaller (e.g. eight, thirty-two, sixty-four, or 128 bits).

As shown, physical connection circuitry 210a–d transmits data frames 302 over data connection 310 to ingress packet circuitry 212a–d. According to embodiments of the present invention, data frames 302 may be up to thirty-two bytes long including a two-byte header and up to a thirty-byte payload. A data frame header may include information such as which channel and/or subchannel that the data frame is associated with. A data frame payload may be less than thirty-two bytes. In instances where data frame payloads are less than thirty-two bytes long, they may be terminated with a designated termination string. For example, some bit pattern such as "11001001" may be included at the end of a less than thirty-two byte data frame payload to indicate the end of the frame. Other embodiments may include data frames of different sizes and structures. For example, data frames 302 may be sixteen, sixty-four, or 128 bytes long, containing no header.

Similarly, as shown, ingress packet circuitry 212a–d transmits acknowledgement messages (ACKs) 304 to physical connection circuitry 210a–d, as indicated in FIG. 3. ACKs 304 may vary in size and structure according to embodiments of the invention. According to embodiments of the invention, ACKs 304 may be associated with all ports (i.e. a global association) or with a particular port. In the case of global port association, when physical connection circuitry 210a–d sends data frames through any port, it receives ACKs that are not associated with any particular port. For example, ACKs received for data frames sent over ports one, two, and three, are not associated with those ports. In the case where ACKs are associated with a give port, for example, when data messages are sent over port one, the corresponding ACKs are associated with port one. According to alternative embodiments of the invention, each ACK 304 may be associated with a particular data frame 302. For example, data frames 304 may be sequentially marked according to a counter. When ingress packet circuitry 212a–d receives a data frame 304, ingress packet circuitry 212a–d sends an ACK 304 bearing the same mark back to physical connection circuitry 210a–d. With this information, physical connection circuitry 210a–d and ingress packet circuitry 212a–d can determine whether a specific data frame 302 or ACK 304 has been received. For example, physical connection circuitry 210a–d may send a data frame 302 marked '1101', which ingress packet circuitry 212a–d receives. Upon receiving the data frame 302 marked '1101', ingress packet circuitry 212a-d may send an ACK 304 marked '1101'. Therefore, based on the marks, each network element data processing unit can determine which data frames/ACKs have been received.

Ingress packet circuitry 212a–d includes memory unit 306 and physical connection circuitry 210a–d includes memory unit 308. Memory units 306 and 308 store data, including data used for transmitting data frames 303 and receiving ACKs 304. However, embodiments of physical connection circuitry 210a–d and ingress packet circuitry 212a–d are not so limited, as they may include a number of storage devices used for storing and processing data. According to embodiments of the invention, memory units 306 and 308 can be located inside or outside ingress packet circuitry 212a–d and physical connection circuitry 210a–d. Physical connection circuitry 210a–d and ingress packet circuitry 212a–d store and process data as described in more detail below. The operation of physical connection circuitry 210a–d and ingress packet circuitry 212a–d, shown in FIG. 3, will now be described in conjunction with the flow diagram illustrated in FIGS. 4, 5, and 6.

Figure 4:
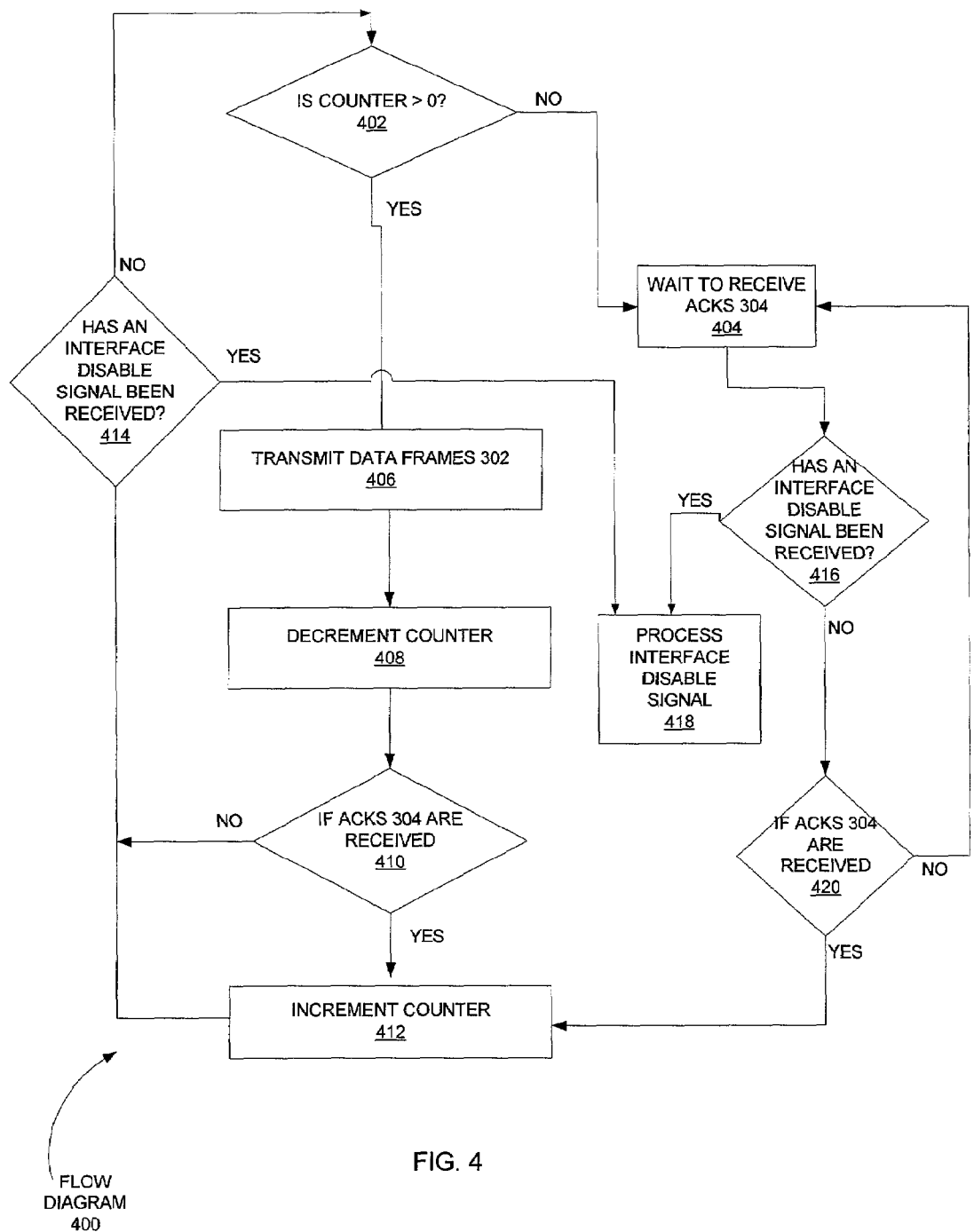
FIG. 4 is a flow diagram for transmitting data to and receiving messages from a network element data processing unit, according to embodiments of the present invention.

FIG. 4 is a flow diagram for transmitting data frames to and receiving acknowledgements from a network element data processing unit, according to embodiments of the present invention. In particular, FIG. 4 includes flow diagram 400, which illustrates physical connection circuitry 210a–d sending data frames to, and receiving acknowledgements from, ingress packet circuitry 212a–d. At decision block 402, flow diagram 400 commences with physical connection circuitry 210a–d determining whether COUNTER is greater than zero. According to embodiments of the invention, COUNTER is a counter for tracking the number of data frames 302 that may be transmitted to ingress packet circuitry 212a–d without receiving an ACK 304. Physical connection circuitry 210a–d initializes COUNTER to a value before Method 400 begins. Physical connection circuitry 210a–d increments COUNTER upon receiving an ACK 304 and decrements COUNTER upon sending a data frame 302. For example, assuming COUNTER is initialized to thirty-two, after physical connection circuitry 210a–d sends two data frames 302 and receives one ACK 304, COUNTER's value is thirty-one. Thus, physical connection circuitry 210a–d may send thirty-one more data frames 302 without receiving an ACK 304. In embodiments of the invention, COUNTER may be stored in memory 308 or other memory devices internal to or external to physical connection circuitry 210a–d.

If COUNTER is not greater than zero, physical connection circuitry 210a–d waits for a predetermined time to receive ACKs 304 sent from ingress packet circuitry 212a–d, at process block 404. Physical connection circuitry 210a–d is waiting because a predetermined number of data frames 302 has been transmitted without receiving an ACK 304. Physical connection circuitry 210a–d determines whether an interface disable signal has been received, at decision block 416. If physical connection circuitry 210a–d receives an interface disable signal, physical connection circuitry 210a–d processes the interface disable signal, at process block 418 (which is described below in conjunction with FIG. 6). Otherwise, physical connection circuitry 210a–d continues at decision block 420. If physical connection circuitry 210a–d receives ACKs, at decision block 420, physical connection circuitry 210a–d proceeds to process block 412, where physical connection circuitry 210a–d increments COUNTER. If no ACKs are received, at decision block 422, physical connection circuitry 210a–d waits to receive ACKs at process block 404. Physical connection circuitry 210a–d continually loops through process block 404 and decision blocks 416 and 420 until ACKs or an interface disable signal has been received.

If COUNTER is greater than zero at decision block 402, physical connection circuitry 210a–d transmits data frames 302 to ingress packet circuitry 212a–d, at process block 406. At process block 408, physical connection circuitry 210a–d decrements COUNTER. At decision block 410, physical connection circuitry 210a–d determines whether any ACKs 304 have been received. If ACKs 304 have been received, physical connection circuitry 210a–d increments COUNTER, at process block 412. If ACKs 304 have not been received, physical connection circuitry 210a–d determines whether an interface disable signal has been received, at process block 414. If an interface disable signal has been received, physical connection circuitry 210a–d processes the signal, at process block 418, which is described in more detail below in conjunction with FIG. 6. Otherwise, physical connection circuitry 210a–d continues to process data, at process block 402.

Figure 5:
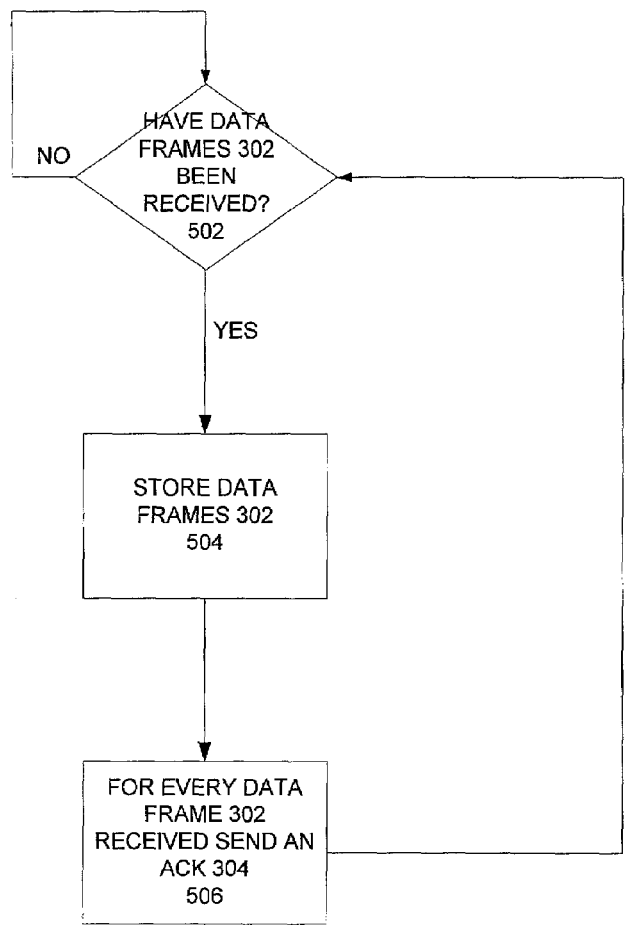
FIG. 5 is a flow diagram for receiving data from and transmitting acknowledgements to a network element data processing unit, according to embodiments of the present invention.

FIG. 5 is a flow diagram for receiving data from and transmitting acknowledgements to a network element data processing unit, according to embodiments of the present invention. In particular, FIG. 5 includes flow diagram 500, which illustrates ingress packet circuitry 212a–d sending acknowledgements to, and receiving data frames 302 from, physical connection circuitry 210a–d. Flow diagram 500 commences at decision block 502, where ingress packet circuitry 212a–d determines whether it has received data frames 302 from physical connection circuitry 210a–d. If ingress packet circuitry 212a–d has not received data frames 302, it loops back to decision block 502. If ingress packet circuitry 212a–d has received data frames 302, it stores them in memory 306, at process block 504, according to embodiments of the invention. According to alternative embodiments, ingress packet circuitry 212a–d may store data frames 302 in other memory storage devices within or external to ingress packet circuitry 212a–d. For every data frame 302 received, ingress packet circuitry 212a–d sends an ACK 304 to physical connection circuitry 210a–d, at process block 506. For example, if ingress packet circuitry 212a–d received five data frames 302, it would send five ACKs 304 to physical connection circuitry 210a–d. Ingress packet circuitry 212a–d continues at decision block 502.

Figure 6:
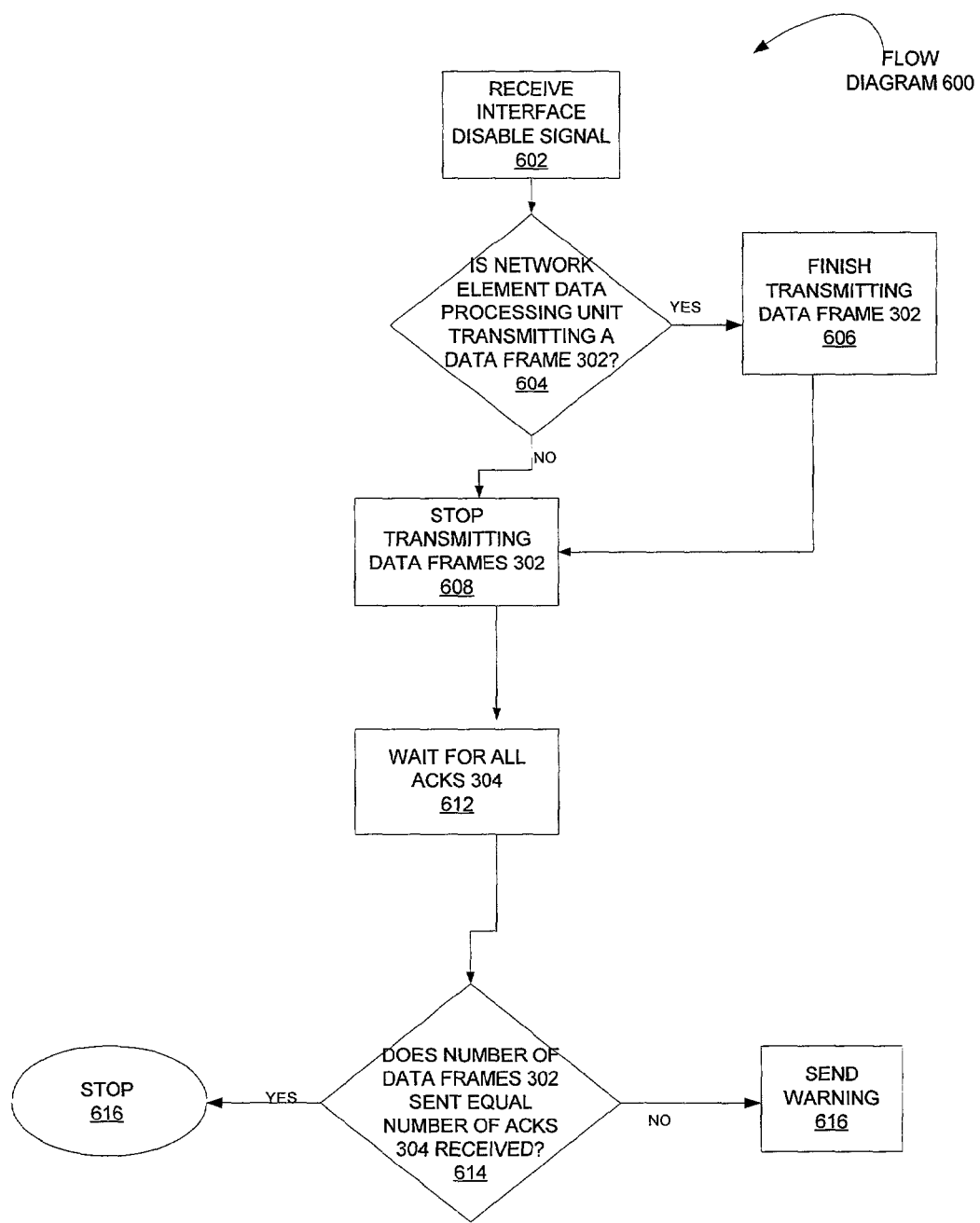
FIG. 6 is a flow diagram for recovering acknowledgements that have not been received by a network element data processing unit.

FIG. 6 is a flow diagram for disabling the interface between network element data processing units. In particular, FIG. 6 includes flow diagram 600, which illustrates physical connection circuitry 210a–d processing an interface disable signal. Furthermore, flow diagram 600 describes in greater detail the processing of the interface disable signal indicated at process block 418 of FIG. 4. An interface disable signal prohibits physical connection circuitry 210a–d from sending data frames 302 to ingress packet circuitry 212a–d, as described below. The processing shown in FIG. 6 describes operations performed by physical connection circuitry 210a–d, but ingress packet circuitry 212a–d continues operating as described in FIG. 5. That is, ingress packet circuitry 212a–d continues receiving physical connection circuitry 210a–d data frames 302 and sending ACKs 304. Prohibiting physical connection circuitry 210a–d from sending data frames allows the network element data processing units to process data received and update internal state information without resetting the entire network element data processing unit. For example, when a network element data processing unit interface is disabled after receiving an interface disable signal, physical connection circuitry 210a–d and ingress packet circuitry 212a–d receive data frames 302 and ACKs 304 and update internal counters without resetting circuitry and without causing data to be lost. Avoiding resetting physical connection circuitry 210a–d and ingress packet circuitry 212a–d reduces data loss, as resetting circuitry overwrites and/or clears stored data. Therefore, disabling the network element data processing unit interface, as described herein, is a nondestructive method for restoring the internal state of network element data processing units.

At process block 602, physical connection circuitry 210a–d receives an interface disable signal. According to embodiments of the invention, a user may send an interface disable signal through a graphical user interface or application-programming interface running on a network workstation. Referring to FIG. 1, network workstations may be connected to non-ring elements or in-ring elements. Alternatively, an interface disable signal may be generated by network element software and/or circuitry in response to a particular system state. For example, when a counter for tracking the number of data frames sent (as described above) is equal to ten for some duration, an interface disable signal can be generated. In other embodiments, an interface disable signal may be periodically generated by network element software and/or circuitry. For example, every 5 minutes an interface disable signal is generated. The frequency with which an interface disable signal is generated may be longer or shorter (e.g. 100 ms or 1 hour), according to embodiments of the invention.

Once the interface disable signal is received, physical connection circuitry 210a–d determines whether it is presently transmitting a data frame 302, at process decision block 604. If physical connection circuitry 210a–d is transmitting a data frame 302, it completes the data frame transmission, at process block 606. Control passes from process block 606 to process block 608. If physical connection circuitry 210a–d is not transmitting a data frame 302, control passes to process block 608. At process block 608, physical connection circuitry 210a–d stops transmitting data frames to ingress packet circuitry 212a–d. Physical connection circuitry 210a–d waits to receive ACKs 304 from ingress packet circuitry 212a–d, at process block 612. Because physical connection circuitry 210a–d stops sending data frames, ingress packet circuitry 210a–d can send an ACK 304 for every data frame 302 it has received, having no data frames 302 for which it has not sent an ACK 304. Similarly, physical connection circuitry 210a–d waits to receive an ACK 304 for every data frame 302 that was sent to ingress packet circuitry 212a–d. Physical connection circuitry 210a–d waits a predetermined amount of time for ACKs 304 to arrive. For example, physical connection circuitry 210a–d may wait 300 milliseconds to receive all ACKs 304 before continuing to process block 614. Other embodiments of the invention may wait a longer or shorter duration before proceeding to process block 614. Physical connection circuitry 210a–d continues at decision block 614, where it determines whether the number of ACKs 304 received equals the number of data frames transmitted. If the number of ACKs 304 received does not equal the number of data frames transmitted, physical connection circuitry 210a–d generates a warning, at process block 616. In embodiments, the warning may be displayed on a network workstation indicating that data frames 302 and/or ACKs 304 are being lost. For example, physical connection circuitry 210a–d may transmit the warning to control card 220 (FIG. 2), which includes logic for displaying the warning on a network workstation display monitor. Alternatively, the warning may be sent to diagnostic hardware and/or software embedded in the network element. The diagnostic hardware and/or software may diagnose and/or correct faults causing the data loss and send messages to a network workstation reporting what measures were taken. If the number of ACKs 304 received equals the number of data frames 302 transmitted, physical connection circuitry 210a–d stops processing the interface disable signal, at process block 616.

The line cards and control cards included in the different network elements include memories, processors and/or Application Specific Integrated Circuits (ASICs). Such memory includes a machine-readable medium on which is stored a set of instructions (i.e., software) embodying any one, or all, of the methodologies described herein. Software can reside, completely or at least partially, within this memory and/or within the processor and/or ASICs. For the purposes of this specification, the term "machine-readable medium" shall be taken to include any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Thus, a method and apparatus for disabling an interface between network element data processing units have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A method comprising:

sending data frames from a first network element data processing unit over a data connection before receiving acknowledgements over the data connection from a second network element data processing unit, wherein a counter represents a number of data frames that may be sent before receiving the acknowledgements, and wherein the counter equal to zero indicates that no frames may be sent before acknowledgements are received;

decrementing the counter when data frames are sent from the first network element data processing unit;

incrementing the counter when acknowledgements are received from the second network element data processing unit;

determining whether the counter is equal to zero;

disabling an interface between the first and second network element data processing units, the disabling causing no data loss within the first and second network element data processing units;

receiving acknowledgements in the first network element data processing unit, after the disabling; and enabling the interface when the counter equals a predetermined number.

2. The method of claim 1 comprising:

determining whether a number of acknowledgements has been received; and sending an error signal, upon determining that the number of acknowledgements has not been received.

3. The method of claim 2, wherein the disabling prohibits the first network element data processing unit from sending data frames over the data connection, and wherein the disabling allows the second network element data processing unit to receive acknowledgements over the data connection.

4. The method of claim 3, wherein the data connection is sent a disable signal generated periodically.

5. The method of claim 3, wherein the data connection disable signal is sent a disable signal by a user through a user interface.

6. An apparatus comprising:

a first network element data processing unit the first network element data processing unit to send acknowledgements and to receive data frames;

a second network element data processing unit, the second network element data processing unit to send data frames and to receive acknowledgements;

a counter to represent a number of data frames that may be sent before receiving the acknowledgements, wherein the counter equal to zero indicates that no frames may be sent before acknowledgements are received and wherein the counter is decremented when data frames are sent from the first network element data processing unit and further wherein the counter is incremented when acknowledgements are received from the second network element data processing unit and a data connection coupled to the first and second network data processing units, the data connection to be disabled when the counter is determined to be equal to zero such that the first network element data processing unit can send acknowledgements, but the second network element data processing unit cannot send data frames.

7. The apparatus of claim 6, the second network element data processing unit to determine whether a number of acknowledgements has been received, and to send a warning signal, upon determining the number of messages has not been received.

8. The apparatus of claim 7, the data connection to be disabled periodically.

9. The apparatus of claim 8, the data connection to be disabled by a user through a user interface.

10. The apparatus of claim 9, wherein the frames include data packets formatted according a number of protocols.

11. The apparatus of claim 10, wherein the number of protocols include Asynchronous Transfer Mode (ATM), Internet Protocol (1P), Frame Relay, voice over IP (voIP), Point-to-Point Protocol (PPP), Multi-Protocol Label Switching (MPLS), and Ethernet.

12. A machine-readable medium that provides instructions, which when executed by a machine, cause said machine to perform operations comprising:

sending data frames from a first network element data processing unit over a data connection before receiving acknowledgements over the data connection from a second network element data processing unit, wherein a counter represents a number of data frames that may be sent before receiving the acknowledgements, and wherein the counter equal to zero indicates that no frames may be sent before acknowledgements are received;

decrementing the counter when data are sent from the first network element data processing unit;

incrementing the counter when acknowledgements are received from the second network element data processing unit;

determining whether the counter is equal to zero;

disabling an interface between the first and second element data processing units, the disabling causing no data loss within the first and second network element data processing units;

receiving acknowledgements in the first network element data processing unit, after the disabling; and enabling the interface when the counter equals a predetermined number.

13. The machine-readable medium of claim 12 comprising:

determining whether the number of acknowledgements has been received; and sending an error signal, upon determining that the number of acknowledgements has not been received.

14. The machine-readable medium of claim 13, wherein the disabling prohibits the first network element data processing unit from sending data frames over the data connection, and wherein the disabling allows the second network element data processing unit to receive acknowledgements over the data connection.

15. The machine-readable medium of claim 14, wherein the data connection is sent a disable signal is generated periodically.

16. The machine readable medium of claim 15, wherein the data connection is sent a disable signal by a user activating an option of a graphical user interface.

* * * * *